United States Patent [19]

Kawamura et al.

[11] Patent Number: 4,924,403
[45] Date of Patent: May 8, 1990

[54] NUMERICAL CONTROL METHOD AND SYSTEM THEREFOR HAVING OVERRIDE PLAYBACK FUNCTION

[75] Inventors: Hideaki Kawamura; Takao Sasaki, both of Hachioji; Shuji Matsuura, Kodaira, all of Japan

[73] Assignee: Fanuc Ltd, Minamitsuru, Japan

[21] Appl. No.: 186,475

[22] PCT Filed: Aug. 17, 1987

[86] PCT No.: PCT/JP87/00614
§ 371 Date: Mar. 16, 1988
§ 102(e) Date: Mar. 16, 1988

[87] PCT Pub. No.: WO88/01406
PCT Pub. Date: Feb. 25, 1988

[30] Foreign Application Priority Data

Aug. 16, 1986 [JP] Japan ............................... 61-191192

[51] Int. Cl.⁵ .............................................. G05B 19/00
[52] U.S. Cl. ............................... 364/474.22; 364/188; 364/192
[58] Field of Search ................... 364/474.22, 188-192

[56] References Cited

U.S. PATENT DOCUMENTS

| 4,370,704 | 1/1983 | Fukuyama et al. | 364/474.22 |
| 4,539,634 | 9/1985 | Sakai et al. | 364/188 |
| 4,774,674 | 9/1988 | Otake | 364/188 |

*Primary Examiner*—Allen MacDonald
*Attorney, Agent, or Firm*—Staas & Halsey

[57] ABSTRACT

A numerical control method and a system therefor can perform numerical control repeatedly in accordance with a numerical control program modified by utilization of an override function. It is judged whether or not a teaching command is inputted during execution of the numerical control program (S1). When it is judged that a feed speed or spindle speed override storage command is inputted in the teaching mode (S2, S6), an override value manually set by an override switch is written into the end of a block in execution in the numerical control program (step S10). At execution of the numerical control program on and after the next time, override operation as set manually is carried out automatically.

15 Claims, 4 Drawing Sheets

NUMERICAL CONTROL METHOD AND SYSTEM THEREFOR HAVING OVERRIDE PLAYBACK FUNCTION

BACKGROUND OF THE INVENTION

1. Field of the Invention

The present invention relates to a numerical control method and a system therefor in which it is possible to carry out numerical control automatically repeatedly in accordance with a numerical control program modified by utilization of an override function.

2. Description of the Related Art

There is a numerical control system (hereinafter referred to as "NC system") of a type which is provided with an override function for modifying, during operation of the NC system, control condition parameter values designated by an NC program (part program). Hitherto, for example, in a machine tool controlled by the NC system of this kind, the override function is utilized, during operation of the machine tool, to adjust a cutting feed speed and a spindle speed designated in an NC work program so as to increase and decrease these speeds in compliance with a workpiece working configuration, workpiece material and an actual working state. However, the conventional speed adjustment using the override function is performed by manual operation of override switches (override dials) provided on the NC system, and is effective only against working in course of being currently carried out. Accordingly, if an attempt is made to continue to carry out work under the previously modified working conditions, as far as the same NC work program is used, the override switches must again be manually operated in like manner at a point of time when the feed speed and the spindle speed have previously been modified, to modify these speeds.

SUMMARY OF THE INVENTION

It is an object of the invention to provide a numerical control method and a system therefor having an override playback function, in which once the override function has been utilized to modify a statement of an NC control program, numerical control can be performed automatically repeatedly in accordance with the modified program.

In order to achieve the above-mentioned object, according to the invention, there is provided a numerical control method and a system therefor having an override playback function.

In the numerical control method according to the invention, it is judged whether or not a teaching mode has been entered during execution of a numerical control program. When it is judged that a predetermined command has been given in the teaching mode, override conditions set manually are additionally stated in a corresponding block of the numerical control program, whereby numerical control is automatically carried out in accordance with the set override conditions at execution of the numerical control program.

The numerical control system according to the invention comprises memory means for storing therein a numerical control program in a read/write random-access manner, setting means for manually setting override conditions, manually operable command means for giving a predetermined command, and a manually operable teaching command means for operating the numerical control system in a teaching mode. When the predetermined command is given in the teaching mode, the set override conditions are additionally stated by program editing means into a corresponding block of the numerical control program, and the numerical control program including the set override conditions is written to the memory means. At execution of this program, numerical control is performed automatically in accordance with the set override conditions.

As described above, the arrangement of the invention is such that the program modified by storing the override parameter set in the teaching mode, into the corresponding block of the numerical control program is used to perform the subsequent numerical control. With such arrangement, it is possible to carry out the numerical control automatically repeatedly under the conditions equivalent to those set during the teaching mode. Accordingly, for example, when products the same in configuration as each other are worked in large quantities, it is unnecessary to operate various kinds of override switches for setting working conditions each time one product is worked, so that an attempt can be made to increase the productivity. In addition, since working is carried out under the same working conditions for every piece, it is possible to produce uniform products in large quantities.

DESCRIPTION OF THE PREFERRED EMBODIMENTS

Figure 1:
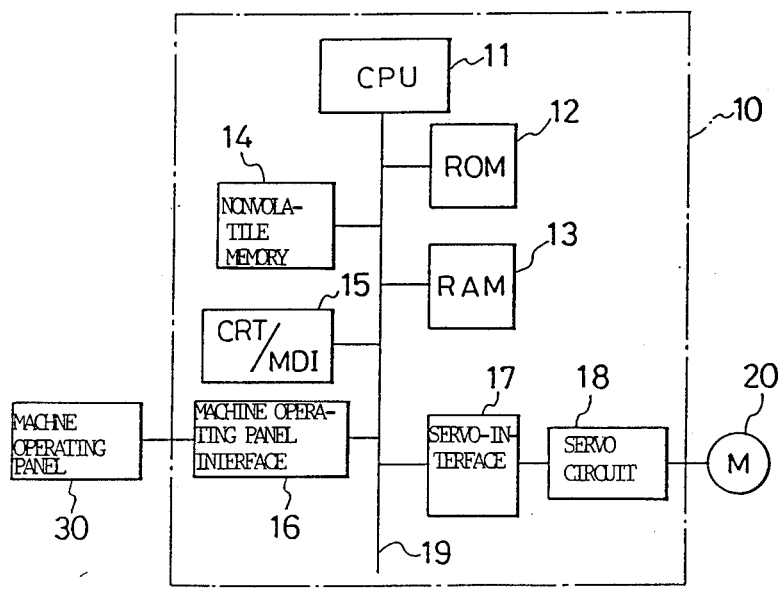
FIG. 1 is a block circuit diagram showing a numerical-control system according to an embodiment of the invention.

In FIG. 1, the reference numeral 10 denotes an NC system which is connected to an NC machine tool (illustration omitted) having a plurality of axes controlled by the system. The NC system 10 comprises a central processor unit (hereinafter referred to as "CPU") 11, a ROM 12 having stored therein a monitor program for executing an teaching processing, an override processing and the like shown in FIGS. 2 through 4, a RAM 13 forming various kinds of registers subsequently to be described and utilized for temporal storage of data and the like, and a nonvolatile memory 14 formed by a bubble memory and having stored therein an NC work program and various kinds of setting values. The NC system 10 further comprises a data input device with a CRT display unit (hereinafter referred to as "CRT/MDI") 15, a machine operating panel interface 16 and a servo-interface 17. The above-mentioned elements 11 through 17 are connected to each other by a bus 19. Connected to the interface 16 is a machine operating panel 30 provided on the machine tool. Connected to the interface 17 are servo circuits (one of which is designated by the reference numeral 18) which correspond respectively to a plurality of axes of the machine tool. Connected respectively to the servo circuits are servomotors (one of which is designated by the reference numeral 20) for driving their respectively corresponding axes.

In the embodiment, the override processing is executed in which the override function of the NC system 10 is utilized in the teaching mode to modify the statement of the work program. The subject (hereinafter referred to as "override parameter") of the processing concerned is a cutting feed speed and a spindle speed. To this end, the machine operating panel 30 has provided thereon conventionally known overdrive switches (not shown) for manually setting override values of the cutting feed speed and spindle speed. Moreover, predetermined ones of a predetermined number of soft keys arranged on the CRT/MDI 15 serve as a teaching command soft key for giving a command to set the NC system 10 to the teaching mode and an override storage command soft key for giving a command to store the override values into registers subsequently to be described. Specifically, the NC system 10 according to the embodiment is so constructed as to vary the corresponding relationship between the respective soft keys and functions of the NC system 10 in compliance with an operator's selection on a screen such that all of a multiplicity of functions of the NC system 10 can be selected by the predetermined number of soft keys. As the operator operates the predetermined soft keys to select the teaching screen, displayed on the screen is an indication of which soft keys should be used as the teaching command soft key and the override storage command soft key. Further, the machine operating panel 30 has arranged thereon a teaching command button, a cutting feed speed override storage command button, a spindle speed override storage command button (all not shown).

Figure 2:
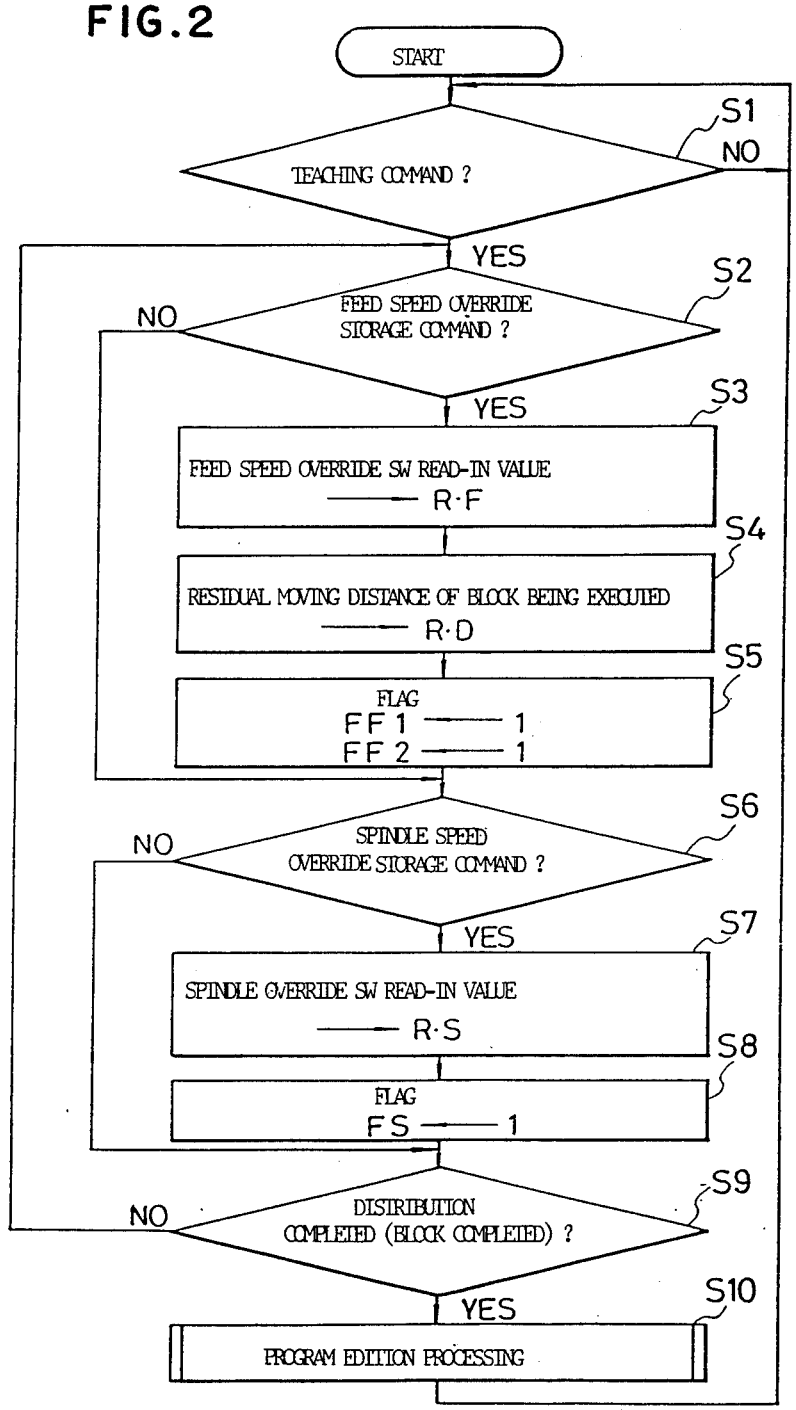
FIG. 2 is a flow chart of override processing executed in a teaching mode.
Figure 3:
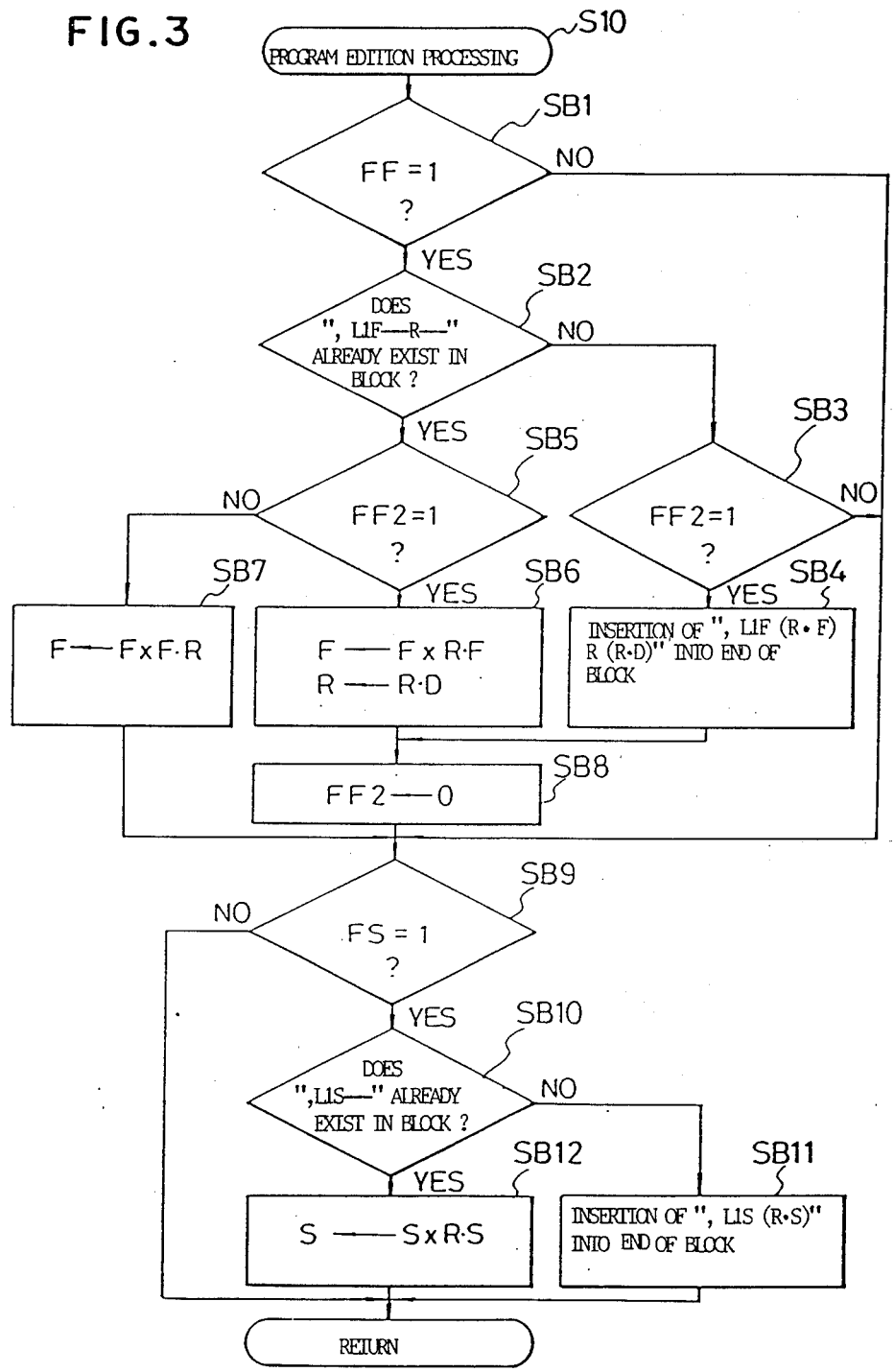
FIG. 3 is a flow chart showing program edition processing in FIG. 2.

The operation of the NC system 10 constructed as above will be described below with reference to FIGS. 2 through 4.

The NC system 10 reads out the NC work program stored in the nonvolatile memory 14, and then carries out a so-called memory operation in which the NC system 10 controls the machine tool in accordance with the program to cause the machine tool to carry out requisite work. During the memory operation, when the operator judges that the cutting feed speed and/or the spindle speed should be adjusted so as to be increased or decreased, based on results of observation of, for example, cutting work circumstances, the operator manually operates the corresponding override switches to set required override values or value. As a result, the override is executed. Further, when the same override should continuously be applied to working of a multiplicity of products, the teaching command soft key of the CRT/MDI 15 or the teaching command button on the machine operating panel 30 is first operated manually to send out a teaching command to the CPU 11. Required override values are then set in a manner like that described above and, subsequently, the feed speed override storage command soft key of the CRT/MDI 15 or a corresponding button on the operating panel 30 and/or the spindle speed override storage command soft key of the CRT/MDI 15 or a corresponding button on the operating panel 30 are/is manually operated to send out feed speed and/or spindle speed override storage commands or command.

In response to the above-described manual operation by the operator, the multitask processable NC system 10 carries out, during the memory operation, processings shown respectively in FIGS. 2 and 3 which are tasks different in level (hierarchy) from the tasks relating to the NC work program, in the following manner in a predetermined cycle.

The CPU 11 of the NC system 10 first monitors whether or not the teaching command is inputted (step S1). When it is judged at the step S1 that the teaching command is inputted, it is judged whether or not the feed speed override storage command is inputted (step S2). When this command is inputted, the CPU 11 reads out the override value set by the feed speed override switch, and stores the override value into a feed speed override storage register R.F (step S3). The CPU 11 also transfers a distance to an end point of a block in course of being currently executed, stored in the predetermined register, that is, a residual moving distance of a major axis in case of straight working, or a residual central angle in case of arcuate working, to a residual quantity storage register R.D to store therein the distance (step S4). Further, the CPU 11 sets a flag FF1 indicative of whether or not the feed speed override storage command has already been inputted, to "1", and also sets a flag FF2 indicative of whether or not the feed speed override storage command has been inputted in the block in course of being executed, to "1", to store inputting of both the commands (step S5).

Subsequently, it is judged whether or not the spindle speed override storage command is inputted (step S6). If inputted, the CPU 11 reads out the override value set by the spindle speed override switch, and stores the override value into a spindle speed override storage register R.S (step S7). The CPU 11 sets a flag FS indicative of whether or not the spindle speed override storage command has been inputted, to "1" to store inputting of this command (step S8).

Until a pulse distribution of the block concerned is completed (step S9), the processings on and after the step S2 are repeated. In the meantime, if the feed speed override storage command and/or the spindle speed override storage command are/is again inputted, the stored values or value in corresponding ones or one of the feed speed override storage register R.F, the residual quantity storage register R.D and the spindle speed override storage register R.S are/is rewritten each time. The override values commanded lastly during execution of the block concerned are stored respectively in the registers R.F and R.S, and the residual quantity at inputting of the last command is stored in the register R D. Thus, as the pulse distribution of the block concerned is completed (step S9), the CPU 11 then performs program edit processing (S10).

In the program edit processing (FIG. 3), it is first judged whether or not the flag FF1 is "1", that is, whether or not the feed speed override storage command has already been inputted (step SB1). If the flag FF1 is not "1", it is judged whether or not the flag FS is "1", that is, the spindle speed override storage command has been inputted (step SB9). If the flag FS is not "1", modification of the program is unnecessary and, therefore, the program is returned to the step S1 in FIG. 2 to stand by for inputting of the teaching command.

If the CPU 11 judges at the step SB1 that the flag FF1 is "1", the CPU 11 judges whether or not the override command program "LIF...R..." (subsequently to be described in detail) is stated in the block completed in the pulse distribution (step SB2). If this statement does not exist in the block concerned, the CPU 11 judges whether or not the flag FF2 is "1", that is, whether or not the feed speed override storage command has been inputted during execution of this block (step SB3). If the flag FF2 is "1", the CPU 11 writes, into the end of this block, an override command code L1, the feed speed override value F having been stored in the feed speed override storage register R.F at the step S3, and the residual moving quantity R having been stored in the residual quantity storage register R.D at the step S4, in the mentioned order. That is, the CPU 11 writes ", LIF (R.F) R (R.D)" into the end of this block concerned, thereby editing the program (step SB4). Usually, the NC program is stored in the nonvolatile memory so as to be divided into pages every certain fixed quantity. Accordingly, the above-mentioned editing is performed in such a fashion that, if insertion of the override command program ", LIF ... R ... " into the NC program results in an excess of the storage information over the capacity of the page in which the block concerned has been stored, the continuation is written to empty pages such that writing proceeds to a page next to the page in which the previous block information concerned has been stored. Thus, as the override command program ", LIF ... R ... " is inserted into the end of the block concerned to edit the program, the flag FF2 is then brought to "038 (step SB8), to store completion of the processing of the feed speed override storage commanded block.

On the other hand, if it is judged at the step SB3 that the flag FF2 is "0", that is, if the feed speed override storage command has already been inputted (FF1=1) into the block preceding the block in course of being currently executed, and if the override command program ", LIF ... R ... " is not stated in the current block, the override command acts in a modal fashion so that the program proceeds to the step SB9 without any editing of the program.

If it is judged at the step SB2 that the program ", LIF ... R ... " of the override command is stated in the end of the block, and if the flag FF2 is "1" (step SB5), that is, if the feed speed override storage command has been inputted during execution of the block concerned to which the feed speed override value has already been written, the override command acts in a modal fashion so that a new override value F obtained by multiplication of the feed speed override value F stated in the current block by the override value lately commanded in substitution for the override value F and stored in the feed speed override storage register R.S is stored in a corresponding area of the memory 14. That is, supposing, for example, that the override value F stated in the program is 80% and the value lately stored in the feed speed override storage register R.S is 90%, then 72% is stored as the new feed speed override value F. Further, the already written residual moving quantity R is rewritten to the newly commanded residual quantity stored in the residual quantity storage register R.D, to thereby carry out editing of the program (step SB6). The flag FF2 is then brought to "0", to store completion of processing of the block concerned having inputted thereinto the feed speed override storage command (step SB8) and, subsequently, the program proceeds to the step SB9.

On the other hand, when, at the steps SB2 and SB5, the override command program has already existed in the block concerned and the override storage command has been inputted at the block prior to the block concerned (FF1=1, FF2=0), the program proceeds to a step SB7. At the step SB7, the override command acts in a modal fashion so that the feed speed override value F is rewritten to a new override value $F \times R.F$, and then the program proceeds to the step SB9.

The program editing with respect to the feed speed override storage command is completed by the processings of the above-mentioned steps SB1 through SB8, and program edit processing is then performed with respect to the spindle speed override storage command. That is, if the flag FS is "1", in other words, if the spindle speed override storage command has been inputted (step SB9), it is judged whether or not the spindle speed override command program ", LIS ... " (subsequently to be described) has already been stated in the block concerned (step SB10). If this statement does not exist, the override command code L1 and the spindle speed override value S which has been stored in the spindle speed override value storage register R.S at the step S7 are written in the mentioned order into the end of the block concerned, specifically, into a corresponding predetermined area in the memory 14, thereby carrying out edition of the program (step SB11). If the statement of the spindle speed override value command program ", LIS ... " has already existed in the end of the block (step SB10), the spindle speed override value S stated in the program is rewritten to a new override value S obtained by multiplication of the value S by the value stored in the spindle speed override value storage register R.S (step SB12).

Thus, the program edit processing (step S10) is completed, and the processings on and after the step S1 are repeated.

The flags FF1, FF2 and FS are set respectively to "0" by the initial setting at a point in time when execution of the NC work program is started. In this manner, the override conditions including the override command L1, the cutting feed speed override value F, the distance R to the end point of block concerned through which the feed speed override is effective, and the spindle speed override value S are stated with the format ", LIF ... R ... , LIS ... ;", and are programmed.

Figure 4:
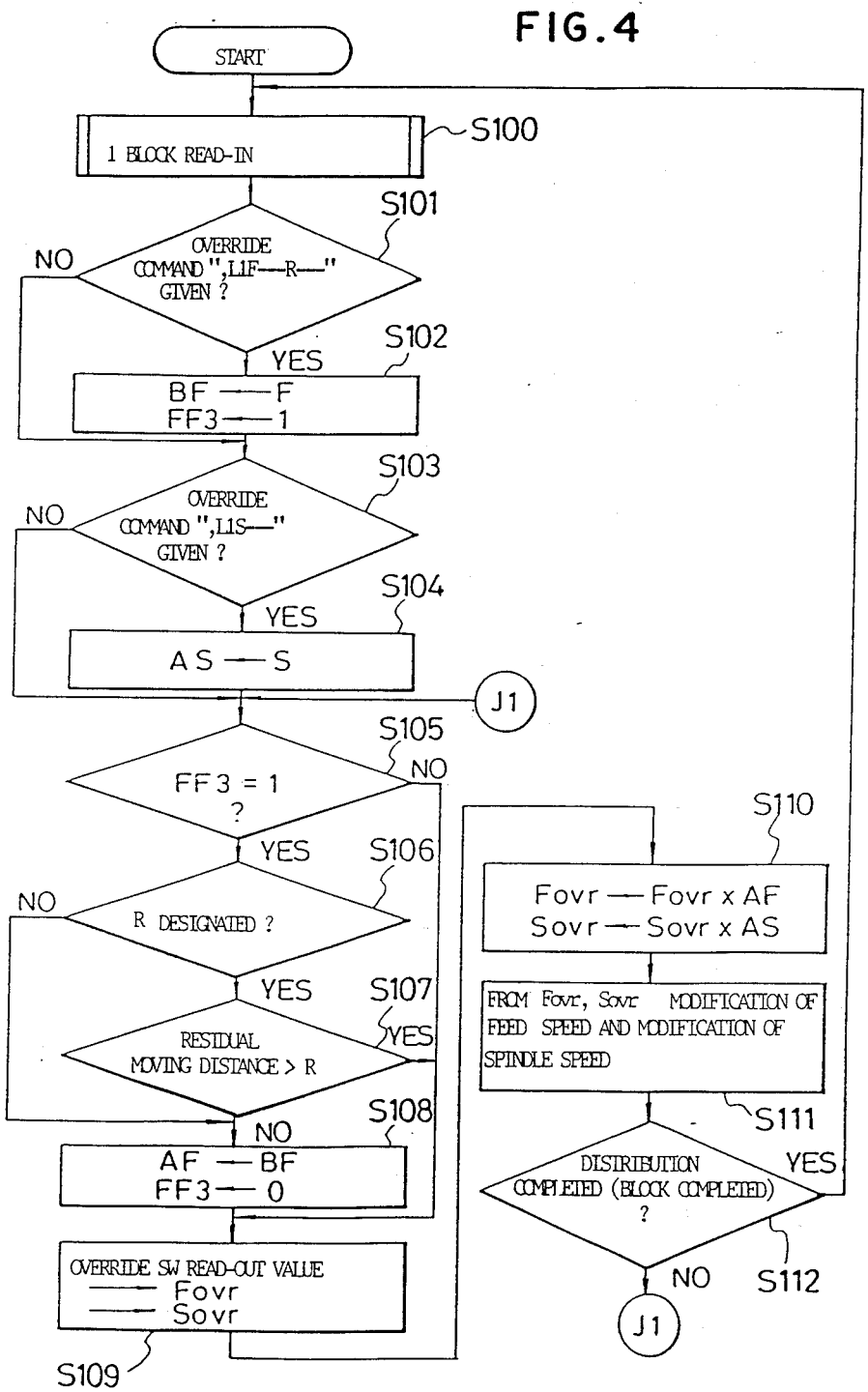
FIG. 4 is a flow chart of a control program for executing the edited NC work program.

When work is carried out by the NC program having the override conditions programmed, the CPU 11 performs the processing shown in FIG. 4, and executes work accompanied with requisite modification of the feed speed and/or the spindle speed.

That is, the CPU 11 reads one block out of the NC work program (step S100), and successively judges whether or not the override command programs or program ", LIF ... R ... " and/or ", LIS ... " are/is stated in the block (steps S101 and S103). If both the statements of the respective override command programs do not exist, the program proceeds to a step S105 where it is judged whether or not a flag FF3 is "1". Subsequently to be described, the flag FF3 is designed to be set to "1" when the feed speed override program command is given (step S102), and is set to "0" by the initial setting. Accordingly, the program proceeds to a step S109 where the CPU 11 reads out the override values set by the feed speed and spindle speed override switches provided on the machine operating panel 30, and stores respectively into a feed speed override value storage register Fovr and a spindle speed override value storage register Sovr. Subsequently, new override values obtained respectively by multiplication of the override values stored in the respective registers Fovr and Sovr, by corresponding feed speed and spindle speed override values commanded by the program and stored in respective registers AF and AS are stored respectively into the registers Fovr and Sovr (step S110). The CPU 11 outputs a feed speed and a spindle speed obtained respectively by multiplication of both the stored values by the cutting feed speed and the spindle speed commanded by the program, and work is carried out (step S111). Since 100% is stored in the registers AF and AS at the initial setting, the stored values of the respective registers Fovr and Sovr are equal respectively to the override values set by the override switches, if the statement of the override command does not exist in the program.

Until a pulse distribution of the block concerned is completed (step S112), processings beginning with and following step 105 are carried out. That is, such steps of the procedure are repeated that if the override command program is not contained in the block to be executed of the program, the steps S105 and S109 through S112 are repeated until a pulse distribution at the block concerned is completed, after steps S100, S101 and S103 have been executed, and as the distribution has been completed, the subsequent block is read in. As a result, if the override values are set by the override switches on the machine operating panel 30, the feed speed and the spindle speed are overridden in accordance with the set values to execute the NC work program.

On the other hand, if the feed speed override command program ", LIF . . . R . . . " exists in the read-in block (step S101), the override value F stated in this command program is stored into a register BF, and a flag FF3 is set to "1" in order to indicate that the feed speed override program command is given (step S102). The flag FF3 is set to "0" at the initial setting. In addition, if the spindle speed override command program ", LIS . . . " exists in the block (step S103), the spindle speed override value S stated in this command program is stored into a program-designated override value storage register AS (step S104). Subsequently, it is judged at the step S105 whether or not the flag FF3 is set to "1", that is, it is judged whether or not the feed speed override is commanded by the program. If the flag FF3 is "1", it is judged whether or not the statement of the residual moving quantity R exists in the command program of this block (step S106). If the statement of the residual moving quantity R does not exist, the program proceeds to a step S108 where the program-commanded feed speed override value stored in the register BF is transferred to a register AF and is stored therein, and the flag FF3 is set to "0".

On the other hand, if the statement of the residual moving quantity R exists and if the residual moving quantity in the block in course of being executed is larger than this residual moving quantity R set by the command program, the program proceeds to the step S109 without execution of the processing at the step S108, that is, without the program-commanded feed speed override value of the register BF being transferred to the register AF, in order to invalidate the program-commanded feed speed override value. Subsequently, as the residual moving quantity becomes smaller than the program-commanded residual moving quantity R, the program-commanded override value is transferred from the register BF to the register AF at the step S108, in order to validate use of the program-commanded override value. Further, at the step S110, the program-commanded override value is multiplied by the override value set by the override switch on the machine operating panel 30, to calculate a new override value. With regard to the spindle speed override, since the program-commanded override value is written to the register AS at the step S104, the program-commanded override value is applied from the beginning of the block with adjustment if necessary by the override switch.

Thus, programming is made to teach the requisite override values to the NC work program. Accordingly, when the NC program is executed, if the override switch on the machine operating panel 30 is brought to 100%, work of the same configuration is carried out under the same working conditions as those when the override values are taught, that is, at the same cutting feed speed and spindle speed. Thus, when the same products are produced in large quantities, it is unnecessary to operate the override switches each time one product is worked, to adjust the working conditions so as to bring them into identity with the previous ones, making it possible to produce uniform products.

In the above-described embodiment, teaching is not made with respect to the initiating position of the spindle speed override, but the override is validated from the beginning of the block concerned into which the spindle speed override storage command has been inputted. However, a position where the spindle speed override is validated may be taught by processing like that of the feed speed override storage command, to thereby validate the program-commanded spindle speed override from that position.

In addition, in the above-described embodiment, when the feed speed override storage commands are inputted several times in the same block, the finally commanded position and the override value are programmed. However, the override value code L1 may be provided in plural such as L2, L3 . . . such that the override values and the residual moving quantities R are programmed with respect to the override storage commands successively inputted in the same block.

Further, in the above-described embodiment, the soft keys or the command buttons provided on the machine operating panel are operated to input the feed speed override storage command and the spindle speed override storage command. However, alteration of the dials of the respective feed speed and spindle speed override switches provided on the machine operating panel may be detected to cause the alteration to serve as override storage commands of the respective feed speed and spindle speed.

Moreover, in the above-described embodiment, the program edit processing is carried out successively after completion of one block. However, when the feed speed override storage command or the spindle speed override storage command is inputted, the program number and the block number at inputting of the storage command may also be stored. In this case, these program number and block number and the feed speed override value and the residual moving quantity of the block in course of being executed, as well as the program number and the block number and the spindle speed override value are stored, and the program editing maybe made collectively at completion of work.

Furthermore, although the embodiment has been described as being applied to control of the NC machine tool, the invention should not be limited to this specific form.

What is claimed is:

1. A numerical control method, having an override playback function, for controlling movement of an apparatus, said method comprising the steps of:

(a) judging whether a teaching mode has been entered during execution of a numerical control program, (b) judging whether a predetermined command is input in said teaching mode, (c) editing, when it is judged in steps (a) and (b) that the predetermined command is given in said teaching mode, the numerical control program to include override conditions, set manually, in a corresponding block of the numerical control program, thereby enabling numerical control in accordance with the override conditions during subsequent execution of the numerical control program without repeating manual setting of the override conditions, and (d) storing, into the corresponding block, a validation distance between a command generation position, at generation of the predetermined command, on an axis of movement of the apparatus controlled by the numerical control program and a target position on the axis at completion of execution of the corresponding block.

2. A numerical control method according to claim 1, wherein said override conditions include an override command, a classification of a control parameter to be override-processed and an override value, and wherein said method further comprises the steps of:

(e) obtaining a command value of the control parameter from the corresponding block of the numerical control program containing the override conditions, and (f) employing the override value in executing the numerical control program.

3. A numerical control method according to claim 2, wherein the control parameter is a working condition parameter of a machine tool controlled by the numerical control program.

4. A numerical control method according to claim 3, wherein the working condition parameter includes at least one of a cutting feed speed and a spindle speed.

5. A numerical control method according to claim 1, further comprising the step of (e) executing the numerical control program, after said editing in step (c) to include the override conditions, with the override conditions invalidated when a remaining distance between a current position on the axis and the target position is larger than the validation distance stored in step (d).

6. A numerical control method according to claim 1, further comprising the step of (d) writing the numerical control program, after said editing in step (c), to a random access memory.

7. A numerical control method according to claim 1, wherein said editing in step (c) includes the steps of (c1) temporarily storing the override conditions during execution of the corresponding block of the numerical control program, and (c2) transferring the override conditions to an area of a random access memory, corresponding to the corresponding block of the numerical control program, for storage therein.

8. A numerical control method according to claim 1, wherein steps (c) and (d) are repeated during execution of the corresponding block, each time said judging in steps (a) and (b) detect input of the predetermined command in the teaching mode.

9. A numerical control method according to claim 8, wherein steps (c) and (d) comprise the steps of storing representations of the override conditions and validation distance, respectively, corresponding to a final detection of the predetermined command in the teaching mode of the corresponding block of the numerical control program.

10. A numerical control method according to claim 8, wherein steps (c) and (d) comprise the steps of storing representations of the override conditions and validation distance, respectively, corresponding to each detection of the predetermined command in the teaching mode of the corresponding block of the numerical control program.

11. A numerical control system, having an override playback function, connectable to an apparatus having an axis controllable by said numerical control system, said numerical control system comprising:

first memory means for storing therein a numerical control program in a read/write random-access manner, setting means for indicating manually set override conditions, manually operable command means for inputting a predetermined command, manually operable teaching command means for indicating operation of said numerical control system in a teaching mode, and program editing means for storing the override conditions into a corresponding block of the numerical control program when the predetermined command is given in the teaching mode, for storing, into the corresponding block, a validation distance between a command generation position on the axis at generation of the predetermined command and a target position on the axis at completion of execution of the corresponding block, and for writing the numerical control program including the override conditions, to said first memory means.

12. A numerical control system according to claim 11, wherein the override conditions include an override command, a classification of a control parameter to be override-processed, and an override value, wherein said numerical control system further comprises execution means for correcting a command value of the control parameter from the corresponding block of the numerical control program including the override conditions using the override value to produce a corrected control parameter value, and for executing numerical control using the corrected control parameter value.

13. A numerical control system according to claim 12, wherein said numerical control system is connected to a machine tool controlled by the numerical control system, and wherein the control parameter comprises at least one of a cutting feed speed and a spindle speed.

14. A numerical control system according to claim 11, further comprising second memory means for temporarily storing therein the override conditions, and wherein said program editing means transfer the override conditions from said second memory means to an area of said first memory means, corresponding to the corresponding block of the numerical control program, to store the override conditions into said first memory means.

15. A numerical control system according to claim 11, further comprising means for invalidating, when the numerical control program including the override conditions is executed, the override conditions when a remaining distance between a current position and the target position on the axis is larger than the validation distance.

* * * * *